INVENTORS
MARTIN F. CARTY
WALTER F. CONABLE
BY
ATTORNEYS

United States Patent Office 2,967,420
Patented Jan. 10, 1961

2,967,420
GUN DIRECTOR TESTING SYSTEM

Martin F. Carty, Elmhurst, and Walter F. Conable, Manhasset, N.Y., assignors to Sperry Rand Corporation, Ford Instrument Company Division, Wilmington, Del., a corporation of Delaware Filed Nov. 12, 1958, Ser. No. 773,224

8 Claims. (Cl. 73—1)

This invention relates to a gun director testing system which provides means for rapidly checking the dynamic performance of a gun order computer and the resulting gun response in a fire control system.

In general, the tester provides means for transmitting the basic input quantities of hypothetical anti-aircraft problems to a shipboard director system and equipment for comparing the answers as generated by the system in response to these input quantities with the correct solutions which are contained in the tester itself. Provision is made for selectively transmitting to a recorder error voltages resulting from incorrect computer calculations for different types of guns. More specifically, a group of cams, nine in number, supply the basic input data to the shipboard computer and the correct solutions for the hypothetical problem to the comparison equipment which is also adapted to receive the actual gun values ordered by the computer to orient the guns under test. Three of the cams contain the normal inputs to a computer in a gun director system, that is, range, bearing and elevation, while the other six cams contain the solutions to the problem, that is gun elevation, gun train and fuse for each of two types of guns, for example, the 5″54 caliber and 3″50 caliber guns. Two speed synchro systems provide the means for transmitting the hypothetical problem to the shipboard computer and the gun solutions are received electrically on the stators of control transformers, the rotors of which are positioned by the six solution cams in the tester. Additionally, the tester provides means for selecting the direction of travel of the simulated target relative to the observer in the hypothetical problem and also means for selecting the location of the guns to be tested, as for example, the forward or aft gun positions on the ship.

One object of the invention is to provide means for rapidly testing the performance of a shipboard director system.

Another object of the invention is to provide a performance tester for a gun director system having means for selectively testing different caliber guns and selecting gun groups according to their placement or location on a warship.

Figure 1:
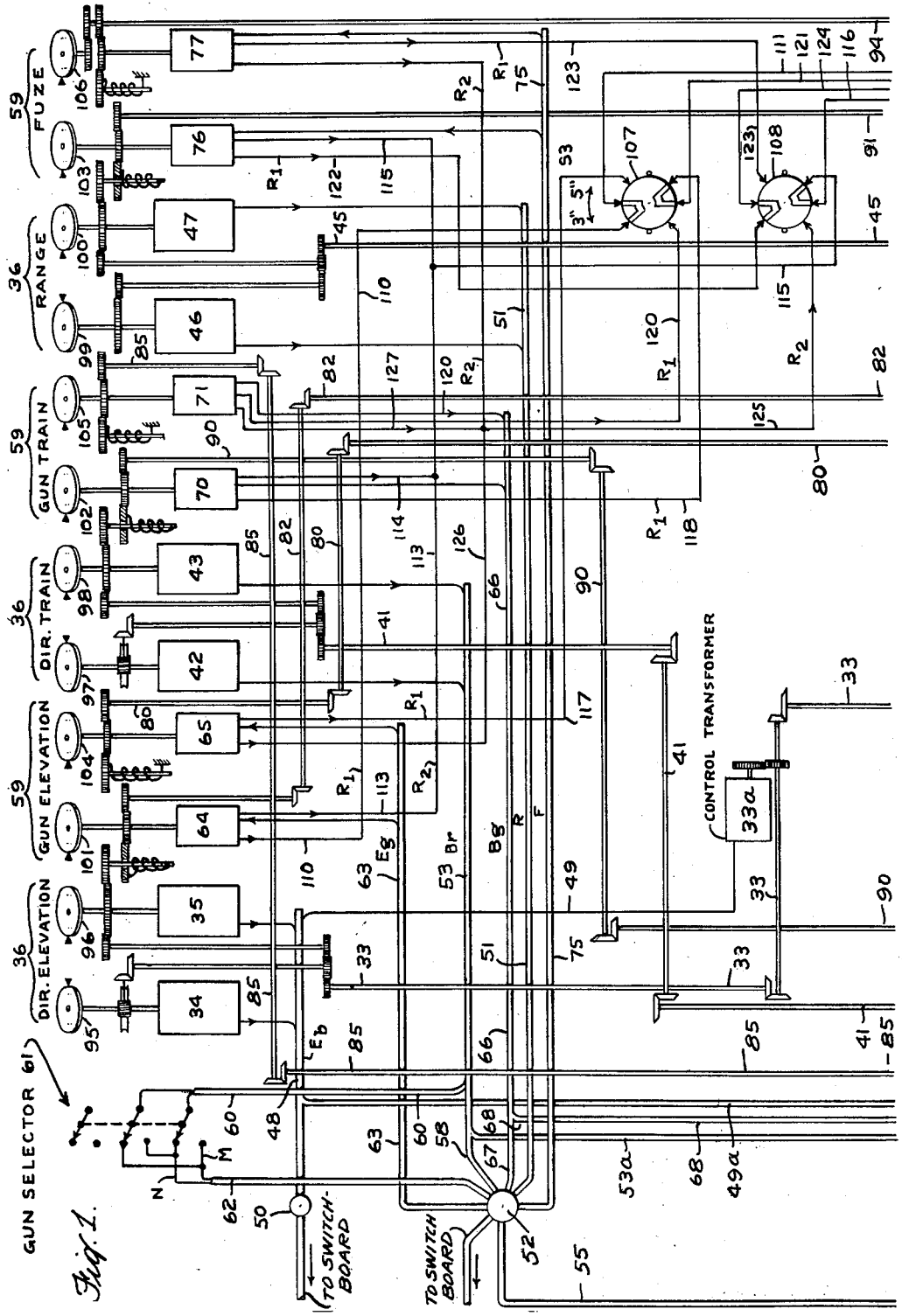
Figure 2:
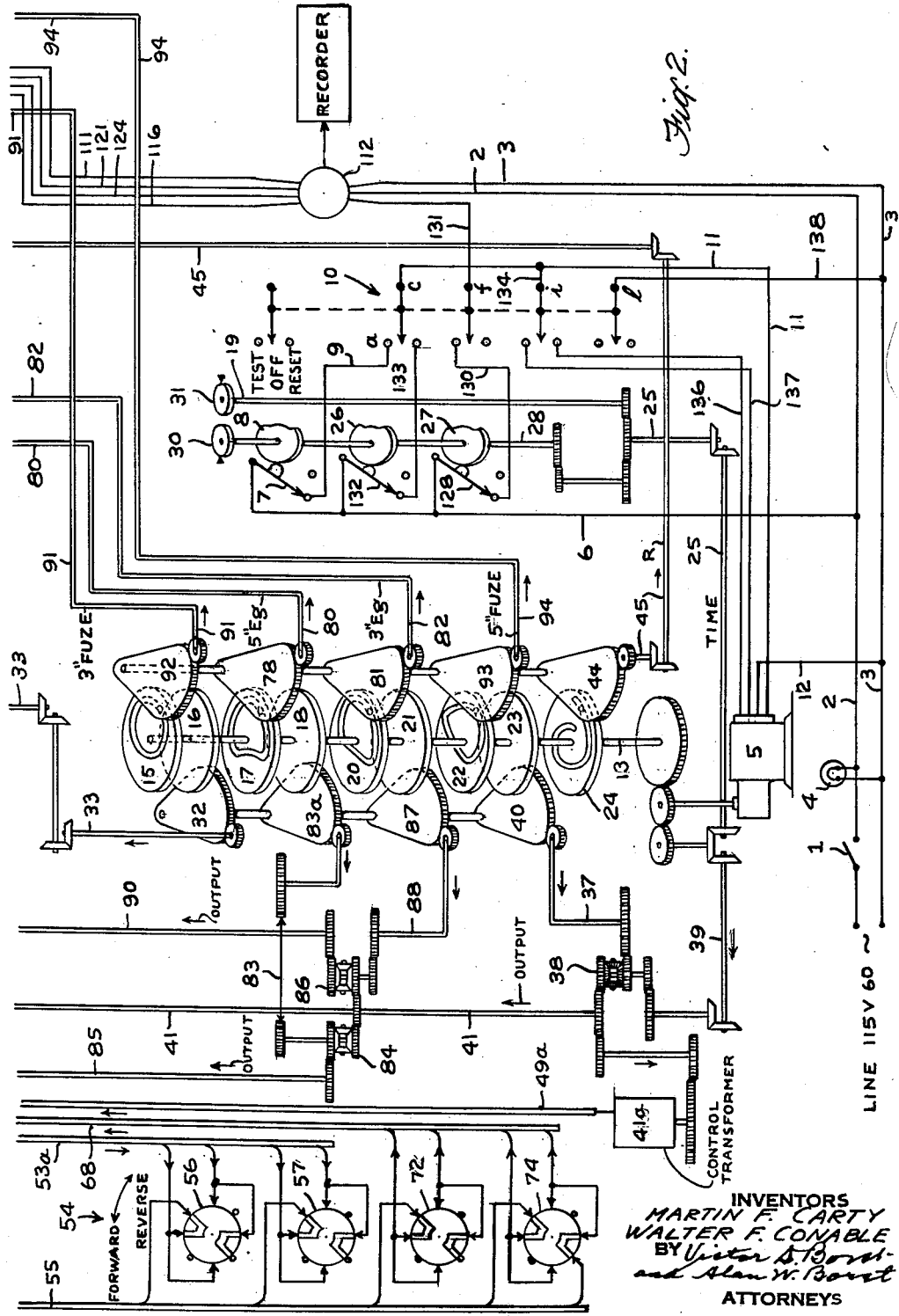

Other objects and advantages of the invention will be apparent to those skilled in the art from the following detailed description which is taken in conjunction with the accompanying drawings in which:

Fig. 1 is a schematic of the synchro transmitter and control transformer section of the tester, and Fig. 2 is the cam section of the tester wherein the input values for the transmitter section and cam solution values for the transformer sections are generated.

As shown in the drawings, power switch 1 connects a 115 volt 60 cycle source to the tester power line comprising leads 2 and 3. A signal light 4 is connected across the tester line serving to give an indication of its energization. A synchronous drive motor 5 is connected to the tester line by means of lead 6, test position micro switch 7, which is held closed by the cam 8, the lead 9, contacts $a$ and $c$ of three-pole position toggle switch 10, output lead 11 and motor lead 12. The motor 5 drives a cam shaft 13 on which are mounted a solution cam 15 for the 3″50 gun fuse, an input cam 16 for introducing elevation angle $E_b$ into the tester and gun director system, an elevation $E_g$ solution cam 17 for the 5″54 guns, a bearing $B_g$ solution cam 18 for the 5″54 guns, an elevation $E_g$ solution cam 20 for the 3″50 guns, a bearing $B_g$ solution cam 21 for the 3″50 guns, a fuse solution cam 22 for the 5″54 guns, a bearing input cam 23 for introducing bearing $B_r$ to the director system and a range input cam 24 for introducing range R to the director system.

Time shaft 25 is driven from the cam shaft 13 and serves to rotatably position the test cam 8, reset cam 26 and recoder cam 27, the cams being mounted on shaft 28. Time dials 30 and 31 are mounted, respectively, on the shafts 28 and 19.

The input and solution cams 15 to 24 have appropriately cut cam grooves for introducing input solution values into the director system and the tester. Cam follower 32 comprising a sector gear is controlled by the groove cut in the under surface of the cam 16 and through a gear and pinion connection rotatably drives input elevation $E_b$ shaft 33. The shaft 33 serves to drive control transformer 33a and to position the rotors of coarse synchro transmitter 34 and fine synchro transmitter 35 of the problem transmission section 36.

The cam 23 containing a range of input values for bearing $B_r$, is employed to place this quantity on to shaft 37 and into one side of differential 38, sector gear 40 providing a cam follower connection between the cam 23 and the shaft 37. Time values are fed on the shaft 39 to the other input side of the differential 38, the output of the differential being fed on shaft 41 to control transformer 41a and to coarse and fine synchro transmitters 42 and 43 of the problem transmission section 36.

The third input value, which is range R, is conveyed to the problem transmission section by means of the cam 24, sector gear follower 44, and shaft 45 which is connected to the rotors of coarse and fine transmitters 46 and 47 respectively.

The elevation quantity $E_b$ is conveyed on cable 48 from the stators of the coarse and fine synchro transmitters 34 and 35 to plug connector 50 and directly to the ship's switchboard for connection to the ship's computer. The cable 48 also carries rotor leads 49 and 49a which originate on the output side of the control transformers 33a and 41a, respectively. Similarly, the range quantity R is carried by cable 51 from the stators of the coarse and fine synchro transmitters 46 and 47, respectively, to plug connector 52 and fed directly to the ship's switchboard.

Cable 53 connects the stators of the synchro transmitters 42 and 43 to the plug connector 52 and the forward-reverse switch 54. Each synchro transmitter has three stator leads and the cable, accordingly, must be adapted to carry the total of six stator leads. The S1 and S3 leads of the bearing transmitters 42 and 43 are contained in a branch cable 53a leading from the cable 53, the S1 and S3 stator leads from the fine synchro transmitter 43 being connected to a cable 55 through polarity reversing switch 56 of the forward-reverse switch 54. The S1 and S3 leads from the stator of the coarse synchro transmitter 42 are connected to the cable 55 through polarity reversing switch 57. The cable 55 is connected to the plug connector 52 and is thereby adapted to convey to the ship's switchboard coarse and fine bearing information $B_r$. The S2 stator leads from the bearing synchro transmitters are carried by a branch cable 58 from the cable 53 directly to the plug connector 52.

The cable 53 also contains two rotor leads R1 and R2 of the coarse synchro transmitter 42. Cable 60 carries the rotor leads to a gun selector, forward and aft switch 61, the output of which is placed on cable 62 having *m* and *n* leads selectively connected to the R1 and R2 rotor leads of the coarse synchro. The cable 62 is connected into the plug connector 52 which is thereby adapted to be used for the transmisson of the coarse transmitter rotor information.

The plug connector 52 is also disposed in the lines carrying gun orientation solutions back to the gun solution sections 59 of the dynamic tester. For example, the position of the gun in elevation $E_g$, which is determined by the ship's computer, is placed on to cable 63 which leads from the plug connector 52 and carries the S1, S2 and S3 stator leads for the 3"50 and 5"54 control transformers 64 and 65. Gun solution values $B_g$ are carried by cable 66 which carries stator leads from the plug connector 52 and the forward-reverse switch 54. Specifically, cable 67 carries the S2 stator leads and cable 68 carries the S1 and S3 stator leads for the 3"50 and 5"54 control transformers 70 and 71. Gun train values $B_g$ for the 3"50 guns on the S1 and S3 stator leads are carried by the cable 55 which is connected to the cable 68 through polarity reversing switch 72 while gun train values $B_g$ for the 5"54 guns are conveyed by the cable 55 to the S1 and S3 stator leads in the cable 68 through polarity reversing switch 74. Gun fuse values F are carried in the stator leads contained by cable 75, three stator leads being connected from the plug connector 52 to the stator of fuse control transformer 76 for the 3"50 guns and the other three stator leads being connected to the control transformer 77 for the 5"54 guns.

The rotors of the control transformers are driven by the appropriate gun solution cams in the tester so that the gun solution values as calculated by the ship's computer may be compared with the true values generated by the solution cams. Accordingly, solution cam 17 is connected to drive the rotor of the control transformer 65 through cam follower 78 and shaft 80 which carries gun elevation values $E_g$ for the 5"54 guns, and solution cam 20 in which there are preset gun elevation values, $E_g$, for the 3"50 guns is connected by the cam follower 81 and shaft 82 to the control transformer 64.

True gun values, $B_g$, for the 5"54 guns are furnished by the solution cam 18 which places the tester solutions for this quantity on shaft 83 through cam follower 83a which is connected to one input side of differential 84 by the shaft 83, the other input side of which is connected to the shaft 41. Differential output shaft 85 connects the differential 84 to the control transformer 71. Predetermined values for gun train, $B_g$, for the 3"50 guns are supplied by the cam 21 which is connected to differential 86 through cam follower 87 and shaft 88. The differential 86 is also connected to receive an input from the shaft 41 and its output shaft 90 serves to position the rotor of the control transformer 70.

Tester fuse values for the 3"50 guns are furnished by the cam 15 which is connected to rotor shaft 91 for the control transformer 76 through the sector gear, cam follower 92 and a pinion mounted on shaft 91. 5"54 values for fuse are furnished by the cam 22 and are fed by cam follower 93 to shaft 94 and the rotor of the control transformer 77.

There is associated with each of the synchro transmitters in the problem transmission section 36 indicator dials 95, 96, 97, 98, 99 and 100 which are mechanically linked to the rotors of the transmitters 34, 35, 42, 43, 46, 47, respectively. These dials furnish an indication of the input values transmitted to the shipboard director from the input cams. Dials 101, 102 and 103 are mechanically linked to the rotors of the control transformers 64, 70, and 76, respectively, and furnish an indication of the computed elevation, train and range values. Dials 104, 105 and 106 are mechanically connected to the rotors of control transformers 65, 71 and 77, respectively, and yield cam solutions for gun elevation, gun train and fuse.

Switches 107 and 108 are employed to selectively transmit the error voltages for the 3"50 and 5"54 guns on the rotor leads of the control transformers to a recorder where the errors representing differences between computer and tester fire control solutions may be displayed. Accordingly, gun elevation error voltages for the 3"50 guns are placed on the R1 rotor lead 110 of the transformer 64 and fed to the switch 107 which is adapted to place these voltages onto plug connector lead 111 and in the plug connector 112 from which they are transmitted to a recorder. R2 rotor lead 113 for the gun elevation transformer 64 for the 3"50 guns is joined to the R2 lead 114 of the gun train transformer 70 to the R2 lead 115 of the control transformer 76. Lead 115 represents a common connection for the three 3"50 transformers and is connected to the plug connector 112 by means of switch 108 and lead 116. The gun elevation error voltages for the 5"54 guns are repeated on lead 117 which is connected to one of the contacts on the 3"50 and 5"54 selector switch 107. The lead 111 is thereby adapted to receive the gun elevation error voltages of the 3"50 or 5"54 guns. Similarly, gun train error voltages for the 3"50 guns generated by the transformer 70 appear on R1 rotor lead 118 connected to another contact of the selector switch 107 while R1 lead 120 connected between the rotor of the transformer 71 and another contact of the selector switch is adapted to receive gun train error voltages for the 5"54 guns. Plug connector lead 121 connects the switch 107 to the plug connector 112 and receives the gun train error voltages of the desired gun group so that they may be transmitted to the recorder. Fuse error voltages for the 3"50 guns produced by the control transformer 76 are fed to the switch 108 by R1 rotor lead 122 and fuse error voltages for the 5"54 guns produced by the control transformer 77 are transmitted to the switch 108 by R1 rotor lead 123. The selected fuse error voltage is then repeated on lead 124 which joins the switch 108 and the plug connector 112 so that the desired error voltage may be conveyed to the recorder. A common connection 125 joins the R2 rotor lead of the control transformer 77 to the R2 rotor leads 126 and 127 of the control transformers 65 and 71, respectively. The output, common lead 116 of the selector switch 108 is thereby adapted to be joined to the R2 rotor leads to the control transformers for the 3"50 or 5"54 guns as desired.

With switch 10 placed in test position and the microswitch 128 held in closed position by the driven cam 27, recorder input leads 130 and 131 are joined to the power lead 6. With the toggle switch 10 in reset position, the recorder input connections to the power source are broken and the microswitch 132 is held in closed position by the cam 26. Reset lead 133 connects the power lead 6 to the lead 11 which is joined to the motor through leads 134 and 136. Motor lead 137 is connected to the lead 134 through the switch 10 when the latter is in test position. The leads 136 and 137 are selectively joined to the power lead 3 by means of lead 138 depending on whether the switch 10 is in test or reset position. Accordingly, the polarity of the motor is reversed when the switch 10 is in reset position as compared with its polarity in test position, and the recorder circuit is broken.

The operation of tester will now be described. Assuming the switches 107 and 108 are at the 3"50 position, the switch 54 is at forward position so that the target has a forward or counterclockwise passage relative to the observer, the switch 61 is at forward guns position and the toggle switch 10 is in off position, closing the power switch S1 applies power to the tester and the recorder and lights the power signal 4. Turning the toggle switch 10 to test position, current passes from the power switch S1 through microswitch 7 which is held closed by the cam 8 and the switch 10 permits the synchronous drive motor 5 to be driven causing it to rotate the cams 15 through 24, inclusive, and cams 8, 26 and 27 as well as the time dials 30 and 31. Cam 27 holds the microswitch 128 closed causing current to flow through the toggle switch 10 to plug connector 112 to start the recorder. Rotation of the cam 16 causes the follower 32 to rotate the shaft 33, dials 95 and 96, coarse and fine synchro transmitters 34 and 35 and control transformer 33a. Synchro voltages from the synchro transmitters 34 and 35 pass through the plug connector 50 and go to the ship's switchboard to the elevation input of the gun value computer causing it to assume a corresponding value. Rotation of the cam 23 drives the follower 40, and there is introduced a train, $B_r$, value into the differential 38 which combines this value with a function of time from the output of the drive motor to drive dials 97 and 98, synchro transmitters 42 and 43 and control transformer 41a. Synchro stator voltages from the synchro transmitters 42 and 43 are connected, respectively, to the appropriate stator leads in the switch 54 while a third stator lead is connected directly to the plug connector 52. The rotor leads of the synchro transmitters 42 and 43 are then connected respectively to the $m$ and $n$ leads of the plug connector 52 through the switch 61 which is employed to select the forward or aft guns for testing purposes. The plug connector 52 connects the rotor stator leads to the ship's switchboard and to the computer's director train receiver. Rotation of the cam 24 similarly drives dials 99 and 100 and synchro transmitters 46 and 47 from which leads pass through the plug connector 52 to the ship's switchboard and the computer range receiver.

With the ship's computer operating on the input values for elevation $E_d$, train $B_r$ and range R, corresponding values of gun elevation $E_g$, gun train $B_g$ and fuse for both the 3"50 and 5"54 guns are produced. The 3"50 and 5"54 gun elevation $E_g$ synchro transmitter stator leads from the shipboard computer are connected, respectively, to the corresponding stator leads of the control transformers 65 and 64, respectively, through the switchboard and plug connector 52. The 5"54 and 3"50 fuse synchro transmitter stator leads are connected, respectively, to the corresponding leads for the control transformers 77 and 76 through the switchboard and plug connector 52. The 5"54 and 3"50 gun train $B_g$ synchro transmitter stator leads are connected, respectively, to the corresponding leads of the gun train control transformers 71 and 70 through the switchboard and plug connector 52. The stator leads S1 and S3 from the plug connector 52 also pass through for the forward-reverse switches 72 and 74 to the gun train control transformers.

At the end of the run, the cam 27 opens the switch 128 to stop the error recorder and the cam 8 opens the switch 7 to stop the dynamic tester.

When the toggle switch 10 is turned from test to reset position, the leads 134, 138 reverse the polarity of the field coils of the motor 5 so that when the lead 11 is connected to the lead 133 and the microswitch 132 is closed, the motor 5 is caused to drive the tester towards the start of the problem at which point the microswitch 132 is opened by the cam 26 and the motor is stopped. Since the recorder lead 131 is disconnected from the power lead 6 when the toggle switch 10 is in reset position, the recorder is not operated while the cams are rotated back to the problem starting point.

To run the problem so that the simulated target is passing in reverse or clockwise direction relative to the observer, the switch 54 is thrown from forward to reverse position. This connects the S1 and S3 stator leads of the coarse and fine train synchro transmitters with the S3 and S1 stator leads, respectively, of the computer train receiver causing the latter to rotate in the opposite direction. The stator leads S1 and S3 of the computer train transmitter are also connected, respectively, to the S1 and S3 stator leads of the gun train control transformers thereby reversing the direction of rotation.

While the cams 20, 21 and 15 are generating gun elevation, gun train and gun fuse solutions for the 3"50 guns, the cams 17, 18 and 21 are generating similar quantities for the 5"54 guns. To record errors for the 5"54 guns instead of the 3"50 guns the switches 107 and 108 are turned to the 5"54 position, thus connecting the rotor leads of the control transformers 65, 71 and 77 to the gun elevation, gun train and the fuse elements of the error recorder. On the other hand, when the switches 107 and 108 are thrown into the 3"50 gun selected position, the rotor leads of the control transformers 64, 70 and 76 are connected to the gun elevation, gun train and fuse elements of the error recorder.

If it is desired to test the aft gun mounts instead of the forward guns the switch 61 is shifted from forward to aft position which causes the rotor leads of the director train transmitters 42 and 43 to be connected with the rotor leads of the computer train receiver so that the receiver is rotated 180 degrees and if the problem is generated with train values varying between 78 degrees and minus 30 degrees, for example, the computer and gun mounts will be operating between 258 degrees and 150 degrees, respectively.

It must be understood that various modifications may be made in the dynamic tester system above described without departing from the skill and scope of the invention as defined in the appended claims.

What is claimed is:

1. A tester for shipboard director systems comprising a plurality of cams, some of said cams yielding basic input data for a hypothetical anti-aircraft problem and the remaining cams yielding selected solutions to said hypothetical anti-aircraft problem according to selected input data, means for driving said cams, synchro transmitters, each of said synchro transmitters being connected to one of said input data cams and having an output connection which transmits said input data to a shipboard director system, control transformers, each of said preselected solution yielding cams being in driving connection with one of said control transformers, said control transformers having input connections which receive problem solutions generated by the shipboard director system, whereby said control transformers yield error quantities on comparison of the problem solutions as produced by the shipboard director system and solution yielding cams.

2. A tester as claimed in claim 1 wherein there is provided switching means for automatically shutting off said cam driving means at the end of the hypothetical problem and for returning said cams, said synchro transmitters and said control transformers to start of problem position.

3. A tester as claimed in claim 2 wherein there is provided an error quantity recorder circuit operated by said cam driving means and said switching means, the latter including means for opening said recorder circuit when the cams are being rotated to the start of problem position.

4. A tester for shipboard director systems comprising a plurality of cams, some of said cams yielding basic input data for a hypothetical anti-aircraft problem and the remaining cams yielding preselected solutions to said hypothetical anti-aircraft problem according to selected input data, means for driving said cams, synchro transmitters, each of said synchro transmitters being connected to one of said input data cams and having an output connection which transmits said input data to a shipboard director system, control transformers, each of said preselected solution yielding cams being in driving connection with one of said control transformers, said control transformers having input connections which receive problem solutions generated by the shipboard director system, each of said synchro transmitters and control transformers having three-phase stator leads and forward-reverse and polarity selecting means connected to the output of one of said synchro transmitters and to the input of the corresponding control transformer.

5. A tester as claimed in claim 4 wherein there is provided switching means for automatically shutting off said cam driving means at the end of the hypothetical problem and for returning said cams, said synchro transmitters and said control transformers to start of problem position.

6. A tester as claimed in claim 5 wherein there is provided an error quantity recorder circuit operated by said cam driving means and said switching means, the latter including means for opening said recorder circuit when the cams are being rotated to the start of problem position.

7. A tester as claimed in claim 6 wherein said solution yielding cams yield solutions for different caliber guns and selective means are disposed between said control transformers and said recorder circuit for passing solution error voltages to the recorder circuit according to gun caliber as desired.

8. A tester as claimed in claim 7 wherein means are connected to said one of the synchro transmitters for selecting gun order solutions for generation by the shipboard director system according to the location of the guns on the ship.

References Cited in the file of this patent

UNITED STATES PATENTS

| 2,497,069 | Carpenter et al. | Feb. 14, 1950 |
| 2,638,269 | Holschuh et al. | May 12, 1953 |

OTHER REFERENCES

Publication: Military Automation, May-June 1958, pages 104–107, "Dynamic Testing of Servos in Radar Systems," by F. G. Willey.